(12) United States Patent
Sato

(10) Patent No.: US 11,305,826 B2
(45) Date of Patent: Apr. 19, 2022

(54) MOBILE BODY HAVING REFLECTION CONTROL LAYER

(71) Applicant: NISSAN MOTOR CO., LTD., Yokohama (JP)

(72) Inventor: Yuichi Sato, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 255 days.

(21) Appl. No.: 16/638,284

(22) PCT Filed: Aug. 14, 2017

(86) PCT No.: PCT/JP2017/029282
§ 371 (c)(1),
(2) Date: Feb. 11, 2020

(87) PCT Pub. No.: WO2019/035157
PCT Pub. Date: Feb. 21, 2019

(65) Prior Publication Data
US 2020/0180709 A1 Jun. 11, 2020

(51) Int. Cl.
*B62D 35/00* (2006.01)
*B62D 25/00* (2006.01)
*B62D 29/00* (2006.01)

(52) U.S. Cl.
CPC .............. *B62D 35/00* (2013.01); *B62D 25/00* (2013.01); *B62D 29/00* (2013.01)

(58) Field of Classification Search
CPC ........ B62D 25/00; B62D 29/00; B62D 35/00; B32B 7/023
See application file for complete search history.

(56) References Cited

U.S. PATENT DOCUMENTS

| | | | |
|---|---|---|---|
| 2015/0291085 A1* | 10/2015 | Manning | F21S 43/14 362/516 |
| 2016/0306194 A1 | 10/2016 | Takahashi | |
| 2018/0337460 A1* | 11/2018 | Kinsler | B32B 7/10 |
| 2019/0178268 A1* | 6/2019 | Shah | B62D 35/00 |
| 2020/0180709 A1* | 6/2020 | Sato | B62D 35/00 |
| 2020/0194605 A1* | 6/2020 | Sato | H01L 31/055 |
| 2020/0376802 A1* | 12/2020 | Sato | B62D 29/00 |
| 2021/0024143 A1* | 1/2021 | Li | G02F 1/0147 |
| 2021/0139081 A1* | 5/2021 | Kanaguchi | B29D 99/001 |
| 2021/0146291 A1* | 5/2021 | Neiser | F15D 1/0045 |

FOREIGN PATENT DOCUMENTS

| | | |
|---|---|---|
| JP | 2000-43758 A | 2/2000 |
| JP | 2005-112108 A | 4/2005 |
| JP | 2006-213095 A | 8/2006 |

* cited by examiner

*Primary Examiner* — Gregory A Blankenship
(74) *Attorney, Agent, or Firm* — Foley & Lardner LLP

(57) ABSTRACT

A mobile body has a reflection control layer that reflects light in a wavelength region of sunlight or in a wavelength region of infrared radiation formed on a surface thereof. A mainstream outside the mobile body is heated by the reflected light to reduce air resistance of the mobile body. A refractive index of the reflection control layer is a value outside a range between a refractive index of a body-side substance and a refractive index of air. A thickness of the reflection control layer is equal to or larger than a value obtained by dividing 187.5 nanometers by a refractive index of the reflection control layer, and equal to or smaller than a value obtained by dividing 275,000 nanometers by a refractive index of the reflection control layer.

9 Claims, 4 Drawing Sheets

MOBILE BODY HAVING REFLECTION CONTROL LAYER

TECHNICAL FIELD

The present invention relates to a mobile body having a reflection control layer formed on a surface thereof.

BACKGROUND ART

Conventionally, in order to suppress power consumption by air conditioning in a railway vehicle, there has been known such a method that the near-infrared ray reflection performance is provided to the railway vehicle without changing the color hue, by increasing a reflectance with respect to light in a wavelength region from 0.78 micrometer to 2.1 micrometers (see Patent Literature 1).

CITATION LIST

Patent Literature

Patent Literature 1: Japanese Patent Laid-Open Publication No. 2006-213095

SUMMARY OF INVENTION

Technical Problem

Meanwhile, the inventors of the present invention have found that it is effective to increase the air temperature in a region (a mainstream) outside a region where an air flow rate near a mobile body decreases (a boundary layer), in order to reduce the air resistance of the mobile body.

However, according to a method described in Patent Literature 1, the reflectance is low with respect to infrared radiation (light in a wavelength region having a length equal to or longer than 2.5 micrometers, such as middle-infrared and far-infrared rays) from straight above a vehicle radiated from moisture in the sky such as clouds. Further, the reflectance is low with respect to light in a wavelength region from 0.75 micrometer to 0.78 micrometer, which is an oxygen absorbing region in the air. Therefore, there is a problem that the light in the infrared radiation and the oxygen absorbing region cannot be used for reducing the air resistance of a mobile body.

The present invention has been made in view of such problems, and an object of the present invention is to increase the temperature of a mainstream around a mobile body to reduce the air resistance of the mobile body.

Solution to Problem

In a mobile body according to the present invention, a reflection control layer is formed on a surface thereof, wherein in a wavelength region from 0.75 micrometer to 100 micrometers, a refractive index of the reflection control layer is a value outside a range between a refractive index of a body-side substance under the reflection control layer and a refractive index of air, and a thickness of the reflection control layer is equal to or larger than a value obtained by dividing 187.5 nanometers by a refractive index of the reflection control layer, and equal to or smaller than a value obtained by dividing 275,000 nanometers by a refractive index of the reflection control layer.

Advantageous Effects of Invention

According to the present invention, the air resistance of a mobile body can be reduced by changing the thickness and the refractive index of a reflection control layer to heat the air in a mainstream by light reflected on the surface of the mobile body and to reduce the density of heated air.

DESCRIPTION OF EMBODIMENTS

Embodiments of the present invention will be described below with reference to the drawings. In the descriptions of the drawings, like parts are denoted by like reference signs and redundant explanations thereof will be omitted. In the following descriptions, a case where a mobile body is an automobile is described as an example.

First Embodiment

Figure 1:
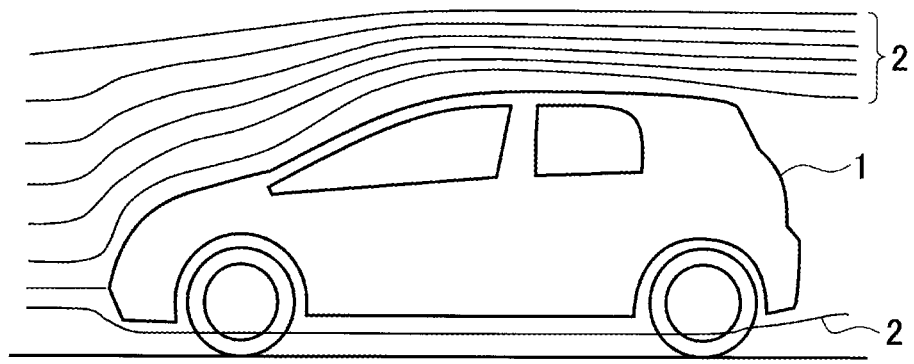
FIG. 1 is a schematic diagram of an air flow generated around an automobile according to a first embodiment of the present invention.
Figure 2:
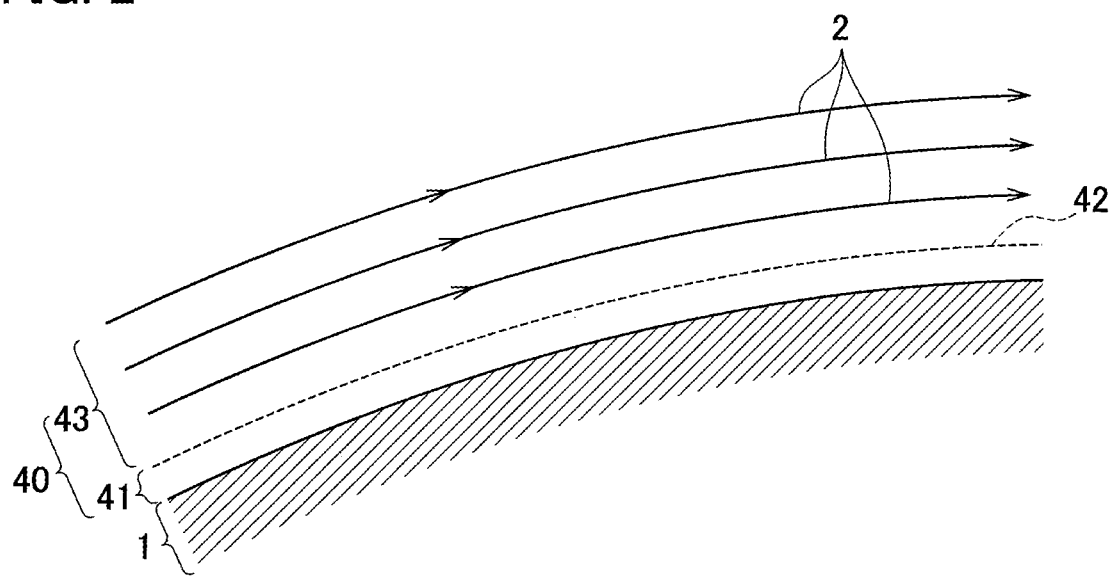
FIG. 2 is a partial sectional view along a traveling direction of the automobile near a surface of the automobile according to the first embodiment of the present invention.
Figure 3:
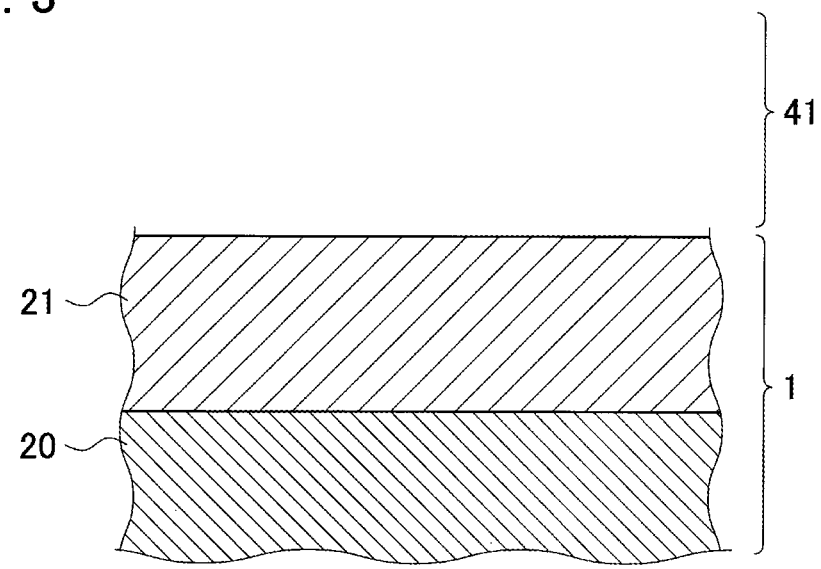
FIG. 3 is an enlarged sectional view illustrating a surface structure of the automobile according to the first embodiment of the present invention.

FIG. 1 is a schematic diagram of an air flow generated during travel of an automobile according to the present embodiment. FIG. 2 is an enlarged sectional view along a traveling direction of the automobile near the surface of the automobile according to the present embodiment. FIG. 3 is an enlarged sectional view illustrating a surface structure of the automobile according to the present embodiment.

As illustrated in FIG. 3, a vehicle-body paint layer 20 is formed on the surface of an automobile 1, and a reflection control layer 21 is further formed on the vehicle-body paint layer 20.

The reflection control layer 21 reflects light in a wavelength region of sunlight (0.3 micrometer to 100 micrometers). The type and thickness of the reflection control layer 21 can be changed according to the position on the surface of the automobile.

The wavelength region of the sunlight consists of a wavelength region of near-ultraviolet radiation (0.3 micrometer to 0.38 micrometer), a visible light region (0.38 micrometer to 0.75 micrometer), and a wavelength region of infrared radiation (0.75 micrometer to 100 micrometers). Further, the wavelength region of the infrared radiation includes a wavelength region of near infrared rays (0.75 micrometer to 3 micrometers), and a wavelength region of middle-infrared and far-infrared rays (3 micrometers to 100 micrometers).

A wavelength region from 0.75 micrometer to 0.78 micrometer, of the wavelength region of the near infrared rays, is a heat absorption band (an oxygen A-band) of oxygen molecules in the air.

<Air Flow Around Automobile During Travel>

As illustrated in FIG. 1, when it is viewed in a static system of the automobile 1, an air flow along the surface of the automobile 1 is generated around the automobile 1 during travel. As illustrated in FIG. 2, the air flow becomes slow due to viscous friction generated between the air and the surface of the automobile near the surface of the automobile 1, to form a boundary layer 41. In the boundary layer 41, as moving away from the surface of the automobile 1, the velocity of air increases, and the velocity of air approaches the relative velocity of the automobile with respect to the air.

In an outside region 43 outside a boundary 42 being away from the surface of the automobile 1, there is no influence of the viscous friction generated between the air and the surface of the automobile, and the velocity of air becomes substantially equal to the relative velocity of the automobile with respect to the air. The air flow in the outside region 43 is referred to as "mainstream 2".

<Mechanism for Reducing Air Resistance>

Next, a mechanism for reducing the air resistance of the automobile 1 by providing the reflection control layer 21 that reflects light in a predetermined wavelength region to the automobile 1 is described.

In general, the force received from the air by the automobile 1 during travel is represented by the force in each axial direction of the front and rear, right and left, and up and down directions of the automobile 1 and a moment around each axis, and is collectively referred to as "six components of aerodynamic force". Normally, the force received from the air by the automobile 1 during travel is represented non-dimensionally. Particularly, an air resistance F being the force in the front and rear direction is represented by an air resistance coefficient $C_d$ represented by the following formula 1. Here, $\rho$ is a density of the air in the outside region 43, A is a frontal projected area with respect to the traveling direction of the automobile 1, and V is a relative velocity of the automobile 1 with respect to the mainstream.

$$C_d = \frac{2F}{\rho V^2 A} \quad \text{[Formula 1]}$$

The air resistance coefficient $C_d$ is a value obtained by dividing the air resistance F by a product of a dynamic pressure of air "$\rho V^2/2$" and the frontal projected area A. The air resistance coefficient $C_d$ is an amount determined depending on the shape of the automobile 1, and affects the fuel consumption at the time of travel, the maximum velocity, the acceleration performance, and the like. In the air resistance F of an object such as the automobile 1, pressure resistance is dominant when it is considered in the automobile 1 as a whole, and friction resistance, which becomes a problem in an aircraft, is small in the automobile 1. Therefore, in order to reduce the air resistance F in the automobile 1, it is effective to focus on a reduction of the pressure resistance.

When reviewing the formula 1 based on the above focusing, in the design of a normal automobile, the frontal projected area A is regarded as an available parameter in the design of a vehicle in order to reduce the pressure resistance. Meanwhile, the air density $\rho$ of the mainstream and the velocity V can vary according to the travel environment of the automobile, and thus the air density $\rho$ and the velocity V are not regarded as an available parameter in the design of a vehicle.

However, the inventors of the present invention consider that the air density $\rho$ of the mainstream can be an available parameter in the design of a vehicle in order to reduce the pressure resistance, without being bound by the framework of existing concepts described above. Then, the present inventors have found that the air density $\rho$ of the mainstream is reduced by heating the air in the mainstream, and as a result, the air resistance F can be reduced, focusing on that the pressure resistance occupying the major part of the air resistance F is proportional to the air density $\rho$ of the mainstream.

Since the air in the mainstream is present at a place away from the surface of the automobile 1, the air cannot be heated directly. However, by providing the reflection control layer 21 that reflects light in a predetermined wavelength region on the surface of the automobile 1, light irradiated from the sun, clouds, and moisture in the air, and light such as infrared rays radiated from the road surface are reflected by the reflection control layer 21, and the air in the mainstream can be heated by the reflected light.

From the reasons described above, since the mobile body has the reflection control layer, air resistance of the mobile body can be reduced.

<Temperature Increase of Mainstream by Reflected Light>

In order to verify that the air in the mainstream can be actually heated by the mechanism described above, the present inventors arranged an automobile fender in a wind tunnel and irradiated simulated sunlight to the fender portion in an air flowing state, in order to simulate the travel environment of the automobile. Then, the present inventors measured how much the temperature increased before and after the air flowing in the portion irradiated with the simulated sunlight passed the portion. Three types of fenders having the same shape but with a different paint from each other were prepared to perform verification. A paint layer formed on the fender corresponds to the reflection control layer 21 in the present embodiment.

Figure 4:
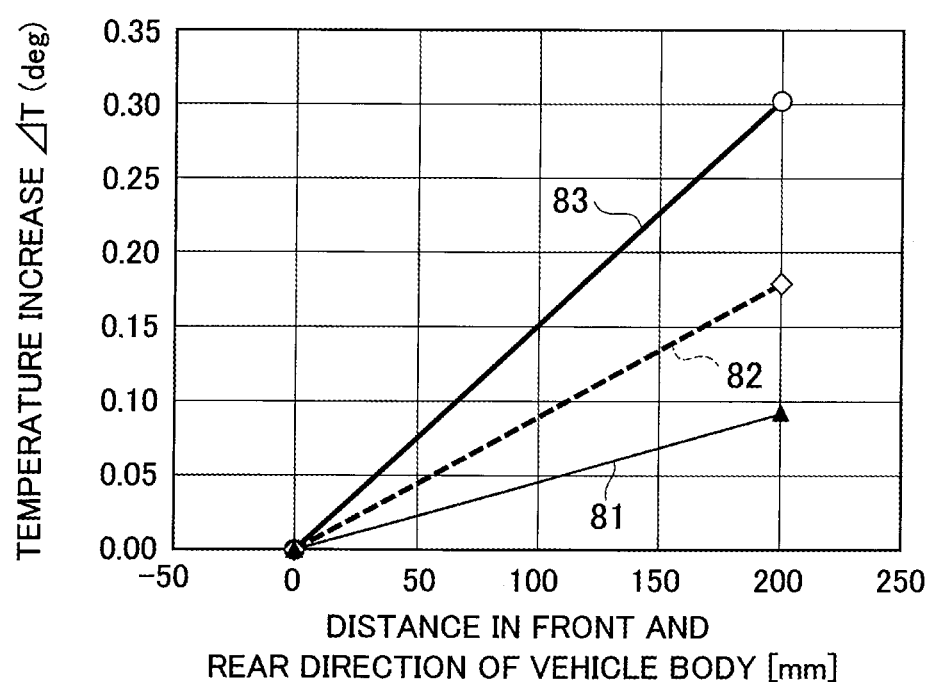
FIG. 4 is a graph illustrating a verification result of the temperature increase of a mainstream by reflected light.

FIG. 4 is a graph illustrating a verification result of the temperature increase of the mainstream by the reflected light. FIG. 4 illustrates evaluation results according to first to third experimental examples in which the verification was performed, where reference sign 81 corresponds to the first experimental example in which standard black paint referred to as "super black" is applied, reference sign 82 corresponds to the second experimental example in which standard white paint referred to as "white pearl" is applied, and reference sign 83 corresponds to the third experimental example in which silver paint by "silver plating" is applied. The average reflectance in a wavelength region from an ultraviolet wavelength to a far infrared wavelength increases in the order of the first to third experimental examples.

Here, the "average reflectance" is a mean value of a spectral reflectance (a reflectance with respect to monochromatic light) in a specified wavelength region. That is, in the specified wavelength region, the spectral reflectance being a wavelength function is measured, and a value acquired by averaging the spectral reflectance measured over the specified wavelength region is defined as "average reflectance".

In the verification, a thermocouple 31a is arranged on an upstream side of a portion irradiated with the simulated sunlight and a thermocouple 31b is arranged on a downstream side of the portion irradiated with the simulated sunlight, along the flow of the air at positions away from the fender surface of the automobile by a distance d in a vertical direction to the surface. Here, the distance d is set to 18 millimeters so that the thermocouples are arranged in the mainstream outside the boundary layer on the surface of the fender. The thermocouple 31a and the thermocouple 31b are arranged with a gap of 200 millimeters along the flow of the air, and the simulated sunlight is irradiated to a section sandwiched between the thermocouple 31a and the thermocouple 31b. The velocity of the air in the mainstream with respect to the fender is set to a wind velocity of 40 kilometers per hour.

For the sake of accuracy of verification, enough attention is paid so that the simulated sunlight is not directly irradiated with respect to the thermocouple 31a and the thermocouple 31b. The air temperature measured by the thermocouple 31a is the temperature of the air immediately before being warmed by the simulated sunlight reflected by the fender, and the air temperature measured by the thermocouple 31b is the temperature of the air immediately after being warmed by the simulated sunlight reflected by the fender.

As illustrated in FIG. 4, it has been found that the temperature measured by the thermocouple 31b is higher than the temperature measured by the thermocouple 31a. Further, it has been found that a temperature increase $\Delta T$ increases in the order of the first to third experimental examples. That is, it has been found that the temperature increase $\Delta T$ becomes larger, as the average reflectance of the paint on the surface of the automobile becomes higher.

When it is assumed that the whole length of an actual automobile is 4400 millimeters, the temperature increase over the whole length of the automobile becomes 22 times the temperature increase $\Delta T$ illustrated in FIG. 4. Therefore, in the actual automobile, temperature increases of about 2K, about 4K, and about 6.6K occur in the order of the first to third experimental examples.

As described above, it has been found that the air in the mainstream can be actually heated by reflecting light by the reflection control layer provided on the surface of the automobile.

When this is applied to an equation of state for an ideal gas, if it is assumed that the air of 300K becomes 306.6K by a temperature increase of 6.6K, a density reduction of about 2% is caused. This corresponds to a reduction of about 2% in the air resistance F.

<Configuration of Reflection Control Layer>

According to the present embodiment, in order to improve the reflectance of light in a predetermined wavelength region, the thickness of the reflection control layer 21 provided on the surface of the automobile 1 is adjusted. This mode is described next.

[Reflection Accompanying Interference in Thin Film]

Figure 5:
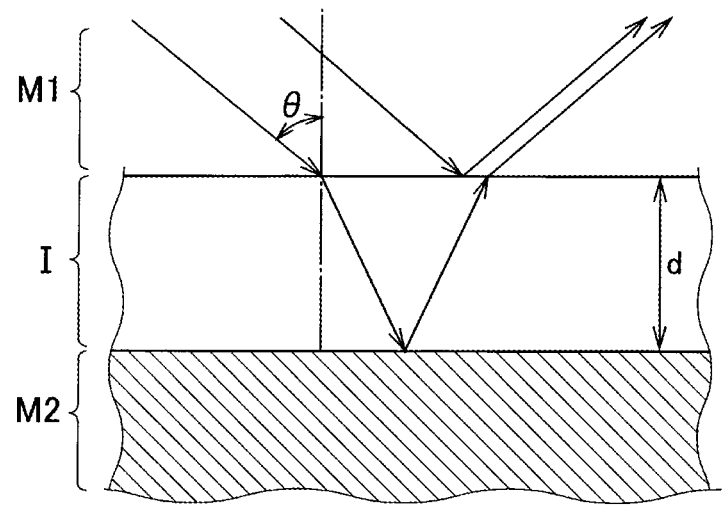
FIG. 5 is a diagram illustrating a state of refraction of light in a thin film sandwiched between substances having a different refractive index.

FIG. 5 is a diagram illustrating a state of refraction of light in a thin film sandwiched between substances having a different refractive index.

FIG. 5 illustrates a state in which a thin film I having a thickness d and a refractive index n is formed on a medium M2 having a refractive index $n_m$, and a medium M1 having a refractive index no is present on the thin film I. It is assumed that light having a wavelength $\lambda$ is incident to the thin film I from the side of the medium M1 at an incident angle $\theta$. Consideration of such a state is a good model to examine the state of an interference of light generated among the vehicle-body paint layer 20, the reflection control layer 21, and the air stacked on the surface of the automobile 1.

An optical path difference L (a difference in optical distance) generated between light reflected by a boundary between the medium M1 and the thin film I and light reflected by a boundary between the thin film I and the medium M2 is represented by the following formula 2.

$$L = 2d\sqrt{n^2 - n_0^2 (\sin\theta)^2} \qquad \text{[Formula 2]}$$

Next, an intensity reflectance R when light incident to the thin film I from the side of the medium M1 is multiply-reflected by the thin film I, and then reflected to return to the medium M1 is calculated.

An amplitude reflectance at the boundary when the light travels from the medium M1 to the thin film I is referred to as $r_1$, and an amplitude reflectance at the boundary when the light travels from the thin film I to the medium M2 is referred to as $r_2$. Further, when an amplitude of light incident to the thin film I from the side of the medium M1 is referred to as $A_0$, and an amplitude of light returning by being reflected by the thin film I is referred to as $A_R$, it has been known that a relation of the following formula 3 is established (however, a case of vertical incidence (a case where an incident angle $\theta$ is 0 degree) is assumed).

$$A_R = \frac{A_0(r_1 + r_2 e^{2i\delta})}{1 + r_1 r_2 e^{2i\delta}} \qquad \text{[Formula 3]}$$

Here, a parameter $\delta$ is represented by the following formula 4.

$$\delta = \frac{2\pi}{\lambda} nd \qquad \text{[Formula 4]}$$

Therefore, the intensity reflectance R is represented by the following formula 5.

$$R = \frac{|A_R|^2}{|A_0|^2} = \frac{r_1^2 + r_2^2 + 2r_1 r_2 \cos(2\delta)}{1 + (r_1 r_2)^2 + 2r_1 r_2 \cos(2\delta)} \qquad \text{[Formula 5]}$$

The amplitude reflectance $r_1$ and the amplitude reflectance $r_2$ are represented by the following formula 6 and formula 7.

$$r_1 = \frac{n_0 - n}{n_0 + n} \qquad \text{[Formula 6]}$$

$$r_2 = \frac{n - n_m}{n + n_m} \qquad \text{[Formula 7]}$$

In order to delete $r_1$ and $r_2$ from the formula 5, the formula 6 and the formula 7 are substituted in the formula 5 to be arranged, and then the intensity reflectance R is represented by the following formula 8.

$$R = 1 - \frac{8n_0 n^2 n_m}{(n_0^2 + n^2)(n^2 + n_m^2) + 4n_0 n^2 n_m + (n_0^2 - n^2)(n^2 - n_m^2)\cos(2\delta)} \qquad \text{[Formula 8]}$$

The intensity reflectance R becomes 0 if the following two conditions are satisfied. A first condition is referred to as "amplitude condition", in which the amplitude reflectance $r_1$ and the amplitude reflectance $r_2$ become equal to each other.

At this time, the refractive index n is represented by the following formula 9 by using the refractive index $n_0$ and the refractive index $n_m$.

$$n=\sqrt{n_0 n_m} \qquad \text{[Formula 9]}$$

A second condition is referred to as "phase condition" and represented by the formula 10. Note that m is an integer equal to or larger than 0.

$$2\delta=(2m+1)\pi \qquad \text{[Formula 10]}$$

The first condition is a condition in which amplitudes of the light reflected by the boundary between the medium M1 and the thin film I and the light reflected by the boundary between the thin film I and the medium M2 match with each other. Further, the second condition is a condition in which a phase difference between the light reflected by the boundary between the medium M1 and the thin film I and the light reflected by the boundary between the thin film I and the medium M2 is an odd multiple of the half wavelength of incident light, and a peak and a trough of the wave just cancel each other.

By deleting the parameter δ from the formula 4 and the formula 10 and arranging the formulae, the following formula 11 regarding the thickness d is acquired.

$$d = \frac{2m+1}{4n}\lambda \qquad \text{[Formula 11]}$$

In the state illustrated in FIG. 5, a case where monochromatic light enters is assumed. However, in the actual design of the thin film such as the reflection control layer, it is necessary to examine a response of the thin film with respect to light in which elements of light of multiple wavelengths are mixed. The intensity reflectance R derived above can be regarded as the spectral reflectance with respect to the light of the wavelength λ. Therefore, a case where the average reflectance increases and a case where the average reflectance decreases are examined based on the behavior of the intensity reflectance R.

Generally, the wavelength λ can take an arbitrary value in a predetermined wavelength region at the time of defining the average reflectance. Therefore, a term "cos(2δ)" appearing in a denominator of the second term on the right hand side in the formula 8 can take a value from −1 to 1.

When it is assumed that "cos(2δ)=1" is established, the intensity reflectance R is represented as $R_1$ of the following formula 12.

$$R_1 = 1 - \frac{4n_0 n_m}{(n_0 + n_m)^2} \qquad \text{[Formula 12]}$$

$R_1$ is equal to the intensity reflectance in the boundary between the medium M1 and the medium M2 in the case where the thin film I is not present in FIG. 5 and the medium M1 and the medium M2 directly come in contact with each other. This can be understood from the fact that "cos(2δ)=1" includes a case where the thickness d of the thin film I is 0, in relation to the formula 4.

On the other hand, when it is assumed that "cos(2δ)=−1" is established, the intensity reflectance R is represented as $R_2$ of the following formula 13.

$$R_2 = 1 - \frac{4n_0 n_m}{\left(n + \frac{n_0 n_m}{n}\right)^2} \qquad \text{[Formula 13]}$$

The intensity reflectance R is a function that oscillates between $R_1$ and $R_2$ described above according to the wavelength λ.

When focusing on the fact that $R_1$ is a constant that does not depend on the refractive index n, in order to increase the average reflectance in the state illustrated in FIG. 5 as compared with a case where the thin film I is not provided, it suffices that "$R_1 < R_2$" is satisfied.

Further, in order to reduce the average reflectance in the state illustrated in FIG. 5 as compared with the case where the thin film I is not provided, it suffices that "$R_1 > R_2$" is satisfied.

The condition for the refractive index n of the thin film I is derived based on these relations.

When the condition for the refractive index n is derived based on the conditional expression "$R_1 < R_2$" for increasing the average reflectance, the condition becomes "$n > n_0$ and $n > n_m$" or "$n < n_0$ and $n < n_m$".

When the condition for the refractive index n is derived based on the conditional expression "$R_1 > R_2$" for reducing the average reflectance, the condition becomes "$n_0 < n < n_m$" or "$n_m < n < n_0$".

Particularly, as a special case of the condition for reducing the average reflectance, if "$R_1 > R_2 = 0$" is assumed, a case where the refractive index n is equal to a geometric mean of the refractive index $n_0$ and the refractive index $n_m$ as in the formula 9 is derived.

Further, since it can be said that $R_2$ characterizes the value of the average reflectance, a condition for the thickness d of the thin film I is also derived.

When the intensity reflectance R takes a value of $R_2$, the formula 11 is derived since "cos(2δ)=−1" is established. When it is assumed that the wavelength region for defining the average reflectance is "$\lambda_{min} \leq \lambda \leq \lambda_{max}$", by using the formula 11, it is indicated that the thickness d is within a range indicated by the following formula 14.

$$\frac{1}{4n}\lambda_{min} \leq d \leq \frac{2m+1}{4n}\lambda_{max} \qquad \text{[Formula 14]}$$

Since m is an integer equal to or larger than 0, it appears that the formula 14 does not define an upper limit of the thickness d. However, when a large value is taken more than necessary for a value of m, the number of times in which the intensity reflectance R oscillates between $R_1$ and $R_2$ increases in the range of the wavelength region of "$\lambda_{min} \leq \lambda \leq \lambda_{max}$". Therefore, the average reflectance approaches $R_1$ to reduce the effect by the thin film I. Accordingly, in the actual design of the thin film I such as the reflection control layer, the value of m is selected so that the practical thickness of the thin film I is included in the range of the thickness d defined by the formula 14, within the practical range of the refractive index. By selecting a maximum value of m allowable within the practical range of the refractive index, the formula 14 provides an upper limit of the thickness d based on the value of m.

As a substance usable as a material of the thin film I, various substances are assumed. As a material having a small refractive index, silver (the refractive index in 563 nanometers is 0.12) is mentioned. Further, as a material having a large refractive index, germanium (the refractive index in 590 nanometers is 5.75) is mentioned.

In the examination described above, it is assumed that the refractive index does not depend on the wavelength, and a case of vertical incidence is assumed. However, the above results of the examination can be applied quantitatively to a case where the refractive index depends on the wavelength and a case of not being vertical incidence.

[Conditions Required for Reflection Control Layer]

In the present embodiment, the reflection control layer 21 that reflects light in a wavelength region of the sunlight or in a wavelength region of infrared radiation is formed on the surface of the automobile 1. Particularly, since the light in a wavelength region from 0.75 micrometer to 100 micrometers incident to the automobile 1 is used for heating the mainstream 2 present around the automobile 1 during travel, the reflection control layer 21 is formed so as to increase the average reflectance with respect to the light in the wavelength region. Conditions for the reflection control layer 21 to reflect the light in the wavelength region from 0.75 micrometer to 100 micrometers are examined below.

In the present embodiment, the reflection control layer 21, the air, and the vehicle-body paint layer 20 (body-side substance) under the reflection control layer 21 respectively correspond to the thin film I, the medium M1, and the medium M2 illustrated in FIG. 5.

In order to increase the average reflectance of the reflection control layer 21 in the wavelength region from 0.75 micrometer to 100 micrometers as compared with the case where the reflection control layer 21 is not provided, it suffices that the conditional expression "$R_1 < R_2$" is satisfied. Therefore, based on the examination described above, it suffices that the reflection control layer 21 is formed of a material having a refractive index larger than both the refractive index of the vehicle-body paint layer 20 and the refractive index of the air in the wavelength region from 0.75 micrometer to 100 micrometers. Alternatively, it suffices that the reflection control layer 21 is formed of a material having a refractive index smaller than both the refractive index of the vehicle-body paint layer 20 and the refractive index of the air in the wavelength region from 0.75 micrometer to 100 micrometers.

That is, the refractive index of the reflection control layer 21 has a value outside a range between the refractive index of the vehicle-body paint layer 20 and the refractive index of the air in the wavelength region from 0.75 micrometer to 100 micrometers.

When the reflection control layer 21 is to be formed on the surface of the automobile 1, it is desired that the thickness range of the reflection control layer 21 is about "20 micrometers to 40 micrometers", in view of easiness of manufacturing and quality assurance.

In the formula 14, when it is assumed that "$\lambda_{min}=0.75$ micrometer" and "$\lambda_{max}=100$ micrometers" are established, and a maximum m at which the formula 14 includes the thickness range of "20 micrometers to 40 micrometers" in the practical range of the refractive index n ($0.12 \leq n \leq 5.75$) is to be obtained, "m=5" is obtained.

Therefore, it is desired that the thickness of the reflection control layer 21 is equal to or larger than a value obtained by dividing 187.5 nanometers by the refractive index n of the reflection control layer 21, and equal to or smaller than a value obtained by dividing 275,000 nanometers by the refractive index n of the reflection control layer 21.

[Effects Obtained by Providing Reflection Control Layer]

Since the refractive index of the reflection control layer 21 takes a value outside the range between the refractive index of the vehicle-body paint layer 20 and the refractive index of the air, the average reflectance in the wavelength region from 0.75 micrometer to 100 micrometers on the surface of the automobile 1 becomes large because of the presence of the reflection control layer 21, as compared with the case where the reflection control layer 21 is not provided. Therefore, the light in the wavelength region from 0.75 micrometer to 100 micrometers can be efficiently reflected. As a result, the mainstream 2 present around the automobile 1 during travel is heated by the light reflected by the surface of the automobile 1. Since the density of the mainstream 2 decreases due to heating, the air resistance F of the automobile 1 can be reduced.

Further, since the light reflected by the reflection control layer 21 includes light in the infrared radiation and the oxygen absorbing region, the air resistance F of the automobile 1 can be reduced by the reflected light.

Further, the thickness of the reflection control layer 21 is adjusted so as to fall within the thickness range defined by the formula 14 based on the wavelength region from 0.75 micrometer to 100 micrometers, and the thickness of the reflection control layer 21 is set to a value equal to or larger than the value obtained by dividing 187.5 nanometers by the refractive index n of the reflection control layer 21, and equal to or smaller than the value obtained by dividing 275,000 nanometers by the refractive index n of the reflection control layer 21. Therefore, the average reflectance in the wavelength region from 0.75 micrometer to 100 micrometers is maximized. As a result, the air resistance F of the automobile 1 can be reduced by the reflected light.

Further, in order to acquire the effect of reducing the air resistance F of the automobile 1 by heating by the reflected light by increasing the average reflectance more reliably, the refractive index of the reflection control layer may be set to a value equal to or larger than 1.01 times the refractive index of the vehicle-body paint layer 20 and equal to or larger than 1.01 times the refractive index of the air. Similarly, the refractive index of the reflection control layer may be set to a value equal to or smaller than 0.99 time the refractive index of the vehicle-body paint layer 20 and equal to or smaller than 0.99 time the refractive index of the air.

As a difference between the refractive index of the reflection control layer 21 and the refractive index of the vehicle-body paint layer 20 and a difference between the refractive index of the reflection control layer and the refractive index of the air become larger, the average reflectance becomes larger. Therefore, it is desired that the refractive index of the reflection control layer 21 is set to be larger as much as possible than both the refractive index of the vehicle-body paint layer 20 and the refractive index of the air, or the refractive index of the reflection control layer 21 is set to be smaller as much as possible than both the refractive index of the vehicle-body paint layer 20 and the refractive index of the air, in the practical range of the refractive index, while satisfying the conditions described above.

[Relation Between Reflection Control Layer and Angle from Horizontal]

In the above descriptions, a case where light enters the reflection control layer 21 vertically is assumed. Light does not always enter the reflection control layer 21 vertically. However, even when light does not enter the reflection control layer 21 vertically, the same operational effects can be acquired.

Figure 6:
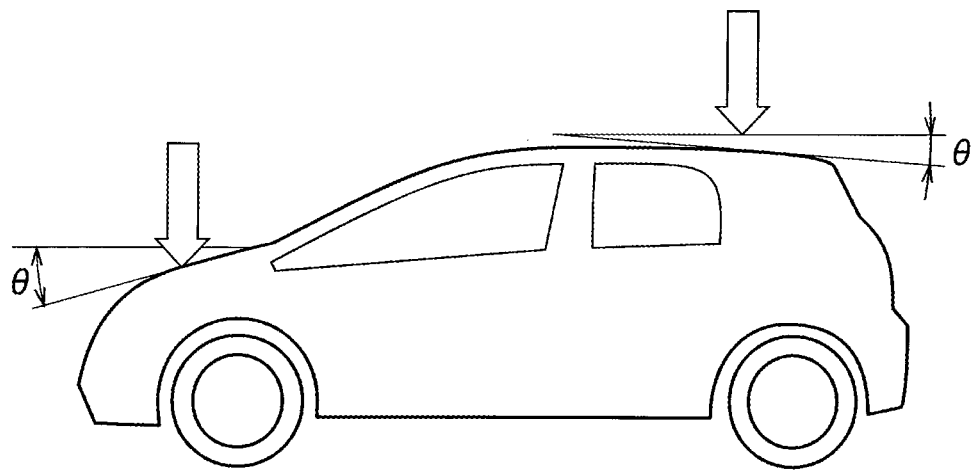
FIG. 6 is an explanatory diagram of an incident angle of light irradiated to a surface of the automobile according to the first embodiment of the present invention.
Figure 7:
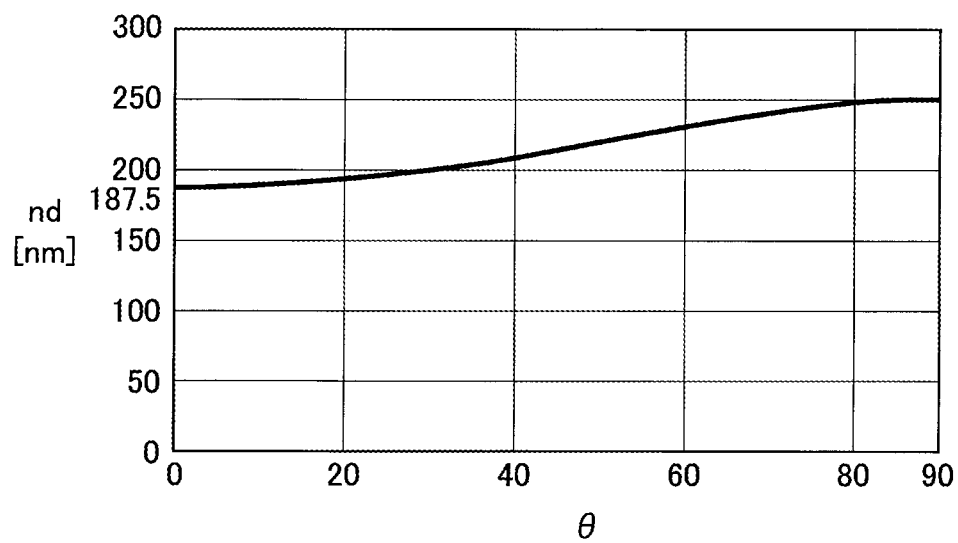
FIG. 7 is a graph illustrating a relation between an incident angle of light and a thickness of a reflection control layer.

It is described that the same operational effects can be acquired with reference to FIG. 6 and FIG. 7. FIG. 6 is an explanatory diagram of an incident angle of light irradiated to the surface of the automobile according to the present embodiment. FIG. 7 is a graph illustrating a relation between the incident angle of light and the thickness of the reflection control layer.

As illustrated in FIG. 6, a state is considered where light such as sunlight enters from immediately above the automobile 1. In this case, light enters vertically with respect to the reflection control layer 21 in a portion horizontal to a travel direction of the automobile 1 (hereinafter, "horizontal portion") such as a top panel of the automobile 1. However, in a front portion of the automobile 1, the fender, and other portions other than the horizontal portion (hereinafter, "inclined portion"), light does not enter the reflection control layer 21 vertically. Therefore, when it is assumed that an inclination angle from horizontal of the inclined portion is θ, the incident angle of light entering immediately above becomes θ.

As the incident angle θ increases from 0 degree and approaches 90 degrees, the magnitude of a portion of square root in the formula 2 becomes smaller. If focusing on the fact that if the optical path difference L is the same in the reflection control layer 21 in the horizontal portion and the reflection control layer 21 in the inclined portion, the same average reflectance is realized in the horizontal portion and the inclined portion, as illustrated in FIG. 7, as the incident angle θ increases from 0 degree and approaches 90 degrees, it is necessary to increase the thickness d of the reflection control layer 21 in the inclined portion.

Therefore, in order to increase the average reflectance in the inclined portion as in the horizontal portion, it suffices to increase the thickness of the reflection control layer 21 in the inclined portion as compared with the thickness of the reflection control layer 21 in the horizontal portion. Further, it suffices to increase the thickness of the reflection control layer 21 in the inclined portion, as the inclination angle θ increases.

As described above, by adjusting the thickness of the reflection control layer 21 in the inclined portion in accordance with the inclination angle, the reflection control layer 21 in the inclined portion can also reflect the light in the wavelength region from 0.75 micrometer to 100 micrometers efficiently. As a result, the air resistance F of the automobile 1 can be reduced by the reflected light.

Second Embodiment

An automobile according to a second embodiment of the present invention is different from that of the first embodiment in that a reflection prevention layer 22 is provided. Other configurations, operations, and effects that are not described in the second embodiment are substantially identical to those of the first embodiment and thus redundant explanations thereof are omitted.

Figure 8:
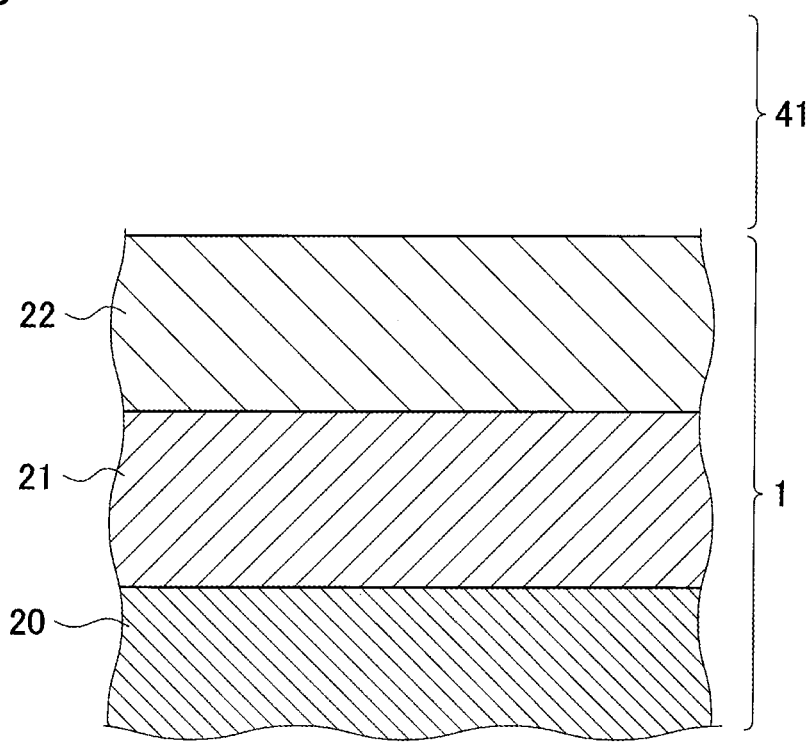
FIG. 8 is an enlarged sectional view illustrating a surface structure of an automobile according to a second embodiment of the present invention.

FIG. 8 is an enlarged sectional view illustrating a surface structure of the automobile according to the present embodiment. As illustrated in FIG. 8, the vehicle-body paint layer 20 is formed on the surface of the automobile 1 and the reflection control layer 21 is further formed on the vehicle-body paint layer 20. The reflection prevention layer 22 for preventing reflection of light in the visible light region from 0.38 micrometer to 0.75 micrometer is further formed on the reflection control layer 21.

By forming the reflection prevention layer 22, reflection of light in the visible light region by the reflection control layer 21 is prevented, thereby increasing the ratio of light in the visible light region reaching the vehicle-body paint layer 20. As a result, color development based on the vehicle-body paint layer 20 is improved.

[Conditions Required for Reflection Prevention Layer]

Conditions for preventing reflection of light in the visible light region by the reflection prevention layer 22 are examined below.

In the present embodiment, the reflection prevention layer 22, the air, and the reflection control layer 21 respectively correspond to the thin film I, the medium M1, and the medium M2 illustrated in FIG. 5.

In order to reduce the average reflectance of the reflection prevention layer 22 in the wavelength region from 0.38 micrometer to 0.75 micrometer, as compared with a case where the reflection prevention layer 22 is not provided, it suffices that the conditional expression "$R_1 > R_2$" is satisfied. Therefore, based on the examination described above, it suffices that in the wavelength region from 0.38 micrometer to 0.75 micrometer, the reflection prevention layer 22 is formed of a material having a refractive index in a range between the refractive index of the reflection control layer 21 and the refractive index of the air.

In order to further reduce the average reflectance of the reflection prevention layer 22, it suffices that a conditional expression "$R_1 > R_2 = 0$" is satisfied and the refractive index of the reflection prevention layer 22 is equal to a geometric mean of the refractive index of the reflection control layer 21 and the refractive index of the air.

When the reflection prevention layer 22 is to be formed on the surface of the automobile 1, it is desired that the thickness range of the reflection prevention layer 22 is about "20 micrometers to 40 micrometers", in view of easiness of manufacturing and quality assurance.

In the formula 14, when it is assumed that "$\lambda_{min} = 0.38$ micrometer" and "$\lambda_{max} = 0.75$ micrometer" are established, and the maximum m at which the formula 14 includes the thickness range of "20 micrometers to 40 micrometers" in the practical range of the refractive index n ($0.12 \leq n \leq 5.75$) is to be obtained, "m=613" is obtained.

Therefore, it is desired that the thickness of the reflection prevention layer 22 is equal to or larger than a value obtained by dividing 95 nanometers by the refractive index n of the reflection prevention layer 22, and equal to or smaller than a value obtained by dividing 230100 nanometers by the refractive index n of the reflection prevention layer 22.

The numerical value "230100 nanometers" should be originally "750 nanometers×(613×2+1)/4=230062.5 nanometers". However, since a significant figure of data of the refractive index is four digits, the value is rounded up to the nearest 100.

It is desired that the refractive index of the reflection prevention layer 22 is from 0.34 to 2.40 inclusive in the visible light region from 0.38 micrometer to 0.75 micrometer, taking into consideration that the reflection control layer 21 is in the practical range of the refractive index n ($0.12 \leq n \leq 5.75$) and the refractive index of the air is about 1.

Further, in order to prevent that the reflection prevention layer 22 prohibits the function of the reflection control layer 21, it is preferable that an effect of the reflection prevention layer 22 to prevent reflection of light in the wavelength region from 0.75 micrometer to 100 micrometers is small. In order to achieve this prevention, it suffices that the reflection prevention layer 22 is formed of a material having a refractive index equal to both the refractive index of the reflection control layer 21 and the refractive index of the air, or larger than those in the wavelength region from 0.75 micrometer to 100 micrometers. Alternatively, it suffices that the reflection prevention layer 22 is formed of a material having a refractive index equal to both the refractive index of the reflection control layer 21 and the refractive index of the air, or smaller than those in the wavelength region from 0.75 micrometer to 100 micrometers.

[Effects of Providing Reflection Prevention Layer]

Since the refractive index of the reflection prevention layer 22 has a value in the range between the refractive index of the reflection control layer 21 and the refractive index of the air, the average reflectance in the wavelength region from 0.38 micrometer to 0.75 micrometer on the surface of the automobile 1 decreases due to the presence of the reflection prevention layer 22, as compared with a case where the reflection prevention layer 22 is not provided. Therefore, reflection of light in the visible light region by the reflection control layer 21 is prevented to increase the ratio of the light in the visible light region reaching the vehicle-body paint layer 20, and as a result, color development based on the vehicle-body paint layer 20 is improved.

Further, the thickness of the reflection prevention layer 22 is adjusted so as to fall within the thickness range defined by the formula 14 based on the wavelength region from 0.38 micrometer to 0.75 micrometer, and the thickness of the reflection prevention layer 22 is set to a value equal to or larger than a value obtained by dividing 95 nanometers by the refractive index n of the reflection prevention layer 22, and equal to or smaller than a value obtained by dividing 230100 nanometers by the refractive index n of the reflection prevention layer 22. Therefore, the average reflectance in the wavelength region from 0.38 micrometer to 0.75 micrometer is minimized. Therefore, reflection of light in the visible light region by the reflection control layer 21 is prevented to increase the ratio of the light in the visible light region reaching the vehicle-body paint layer 20, and as a result, color development based on the vehicle-body paint layer 20 is improved.

Further, since the reflection prevention layer 22 is to reduce the average reflectance in the wavelength region from 0.38 micrometer to 0.75 micrometer, the function of the reflection control layer 21 that reflects light in the wavelength region from 0.75 micrometer to 100 micrometers is not prohibited. Therefore, the reflection prevention layer 22 can improve the color development of the vehicle-body paint layer 20, while maintaining the function of reducing the air resistance and the reflection performance of the reflection control layer 21.

Further, the refractive index of the reflection prevention layer 22 is from 034 to 2.40 inclusive in the visible light region from 0.38 micrometer to 0.75 micrometer, the color development of the vehicle-body paint layer 20 can be improved, while reliably maintaining the function of reducing the air resistance by the reflection control layer 21, correspondingly to a case where the reflection control layer 21 has a practical refractive index.

In the respective embodiments described above, a case where the mobile body is an automobile has been described. However, the present invention can be applied to a mobile body that moves in the air, other than an automobile. As an example of the mobile body, a two-wheeled vehicle, railway train, aircraft, rocket, and the like can be mentioned other than an automobile.

Although the contents of the present invention have been described above with reference to the embodiments, the present invention is not limited to these descriptions, and it will be apparent to those skilled in the art that various modifications and improvements can be made. It should not be construed that the present invention is limited to the descriptions and the drawings that constitute a part of the present disclosure. On the basis of the present disclosure, various alternative embodiments, practical examples, and operating techniques will be apparent to those skilled in the art.

In is needless to mention that the present invention also includes various embodiments that are not described herein. Therefore, the technical scope of the present invention is to be defined only by the invention specifying matters according to the scope of claims appropriately obtained from the above descriptions.

REFERENCE SIGNS LIST 1 automobile (mobile body)
2 mainstream
20 vehicle-body paint layer
21 reflection control layer
22 reflection prevention layer
41 boundary layer
42 boundary
43 outside region

The invention claimed is:

1. A mobile body having a reflection control layer that reflects light in a wavelength region of sunlight or a wavelength region of infrared radiation formed on a surface of the mobile body, wherein
in a wavelength region from 0.75 micrometer to 100 micrometers,
a refractive index of the reflection control layer is a value outside a range between a refractive index of a body-side substance under the reflection control layer and a refractive index of air, and
a thickness of the reflection control layer is equal to or larger than a value obtained by dividing 187.5 nanometers by the refractive index of the reflection control layer, and equal to or smaller than a value obtained by dividing 275,000 nanometers by the refractive index of the reflection control layer.

2. The mobile body according to claim 1, wherein
in the wavelength region from 0.75 micrometer to 100 micrometers,
the refractive index of the reflection control layer is larger than both the refractive index of the body-side substance and a refractive index of air.

3. The mobile body according to claim 2, wherein
in the wavelength region from 0.75 micrometer to 100 micrometers,
the refractive index of the reflection control layer is equal to or larger than 1.01 times the refractive index of the body-side substance and equal to or larger than 1.01 times the refractive index of the air.

4. The mobile body according to claim 2, wherein
the thickness of the reflection control layer is increased, as an inclination angle from horizontal of the surface increases.

5. The mobile body according to claim 2, wherein
a reflection prevention layer is laminated on a surface of the reflection control layer, and
in a visible light region from 0.38 micrometer to 0.75 micrometer,
a refractive index of the reflection prevention layer is equal to a geometric mean of the refractive index of the reflection control layer and the refractive index of the air, and
a thickness of the reflection prevention layer is equal to or larger than a value obtained by dividing 95 nanometers by the refractive index of the reflection prevention layer, and equal to or smaller than a value obtained by dividing 230100 nanometers by the refractive index of the reflection prevention layer.

6. The mobile body according to claim 5, wherein in the visible light region from 0.38 micrometer to 0.75 micrometer, the refractive index of the reflection prevention layer is from 0.34 to 2.40 inclusive.

7. The mobile body according to claim 1, wherein in the wavelength region from 0.75 micrometer to 100 micrometers, the refractive index of the reflection control layer is smaller than both the refractive index of the body-side substance and the refractive index of air.

8. The mobile body according to claim 7, wherein in the wavelength region from 0.75 micrometer to 100 micrometers, the refractive index of the reflection control layer is equal to or smaller than 0.99 time the refractive index of the body-side substance and equal to or smaller than 0.99 time the refractive index of the air.

9. The mobile body according to claim 1, wherein the reflection control layer is formed on a paint layer on the surface of the mobile body.

\* \* \* \* \*